US012657867B2

(12) United States Patent
Foley et al.

(10) Patent No.: US 12,657,867 B2
(45) Date of Patent: Jun. 16, 2026

(54) SYSTEM, METHOD, AND APPARATUS FOR APPLYING COMPUTER VISION, ARTIFICIAL INTELLIGENCE, AND MACHINE LEARNING TO IDENTIFY, MEASURE, AND VALUE PRODUCT PLACEMENT AND SPONSORED ASSETS

(71) Applicant: U-MVPindex LLC, Austin, TX (US)

(72) Inventors: Brian Foley, Austin, TX (US); Brandon Nutting, Buda, TX (US)

(73) Assignee: U-MVPINDEX LLC, Austin, TX (US)

( * ) Notice: Subject to any disclaimer, the term of this patent is extended or adjusted under 35 U.S.C. 154(b) by 291 days.

(21) Appl. No.: 18/594,308

(22) Filed: Mar. 4, 2024

(65) Prior Publication Data

US 2024/0296653 A1    Sep. 5, 2024

Related U.S. Application Data

(60) Provisional application No. 63/449,463, filed on Mar. 2, 2023.

(51) Int. Cl.
| | |
|---|---|
| *G06K 9/00* | (2022.01) |
| *G06Q 30/0242* | (2023.01) |
| *G06Q 30/0251* | (2023.01) |
| *G06V 10/74* | (2022.01) |

(52) U.S. Cl.
CPC ......... *G06V 10/74* (2022.01); *G06Q 30/0242* (2013.01)

(58) Field of Classification Search
USPC ........ 382/100, 103, 111, 113, 141, 155, 168, 382/173, 181, 224, 254, 305; 705/14.66, 705/344; 235/375
See application file for complete search history.

(56) References Cited

U.S. PATENT DOCUMENTS

| | | | | |
|---|---|---|---|---|
| 10,474,858 | B2 * | 11/2019 | Davis ................... | G06Q 20/208 |
| 12,254,611 | B2 * | 3/2025 | Rhoads ................. | G06V 20/52 |
| 2002/0128907 | A1 * | 9/2002 | Sato ................... | G06Q 30/0251 |
| | | | | 705/344 |
| 2005/0125289 | A1 * | 6/2005 | Beyda ................ | G06Q 30/0255 |
| | | | | 705/14.66 |
| 2011/0208586 | A1 * | 8/2011 | Joa ..................... | G06Q 30/0255 |
| | | | | 235/375 |
| 2022/0108042 | A1 * | 4/2022 | Bowen ................... | G06T 11/60 |
| 2024/0412550 | A1 * | 12/2024 | Tsibulevskiy ......... | G06F 3/0484 |

* cited by examiner

*Primary Examiner* — Seyed H Azarian
(74) *Attorney, Agent, or Firm* — Dickinson Wright PLLC; Ross Spencer Garsson

(57) ABSTRACT

A system, method, and apparatus for identifying product placement utilizing a computer vision, artificial intelligence, and/or machine-learning model that includes an object recognition model. The computer vision, artificial intelligence, and/or machine-learning model can be trained to recognize each placement pattern in a first directory of placement patterns, eliminate additional data, where the additional data includes data not recognized as being in the first directory of placement patterns, and recognize each first pixel pattern in a second directory of pixel patterns. The system, method, and apparatus can be utilized to recognize, using the computer vision, artificial intelligence, and/or machine-learning model, the placement patterns present in an image; eliminate the additional data from the image, construct a modified image including the recognized placement patterns; and identify the first pixel patterns present in the modified image.

15 Claims, 6 Drawing Sheets

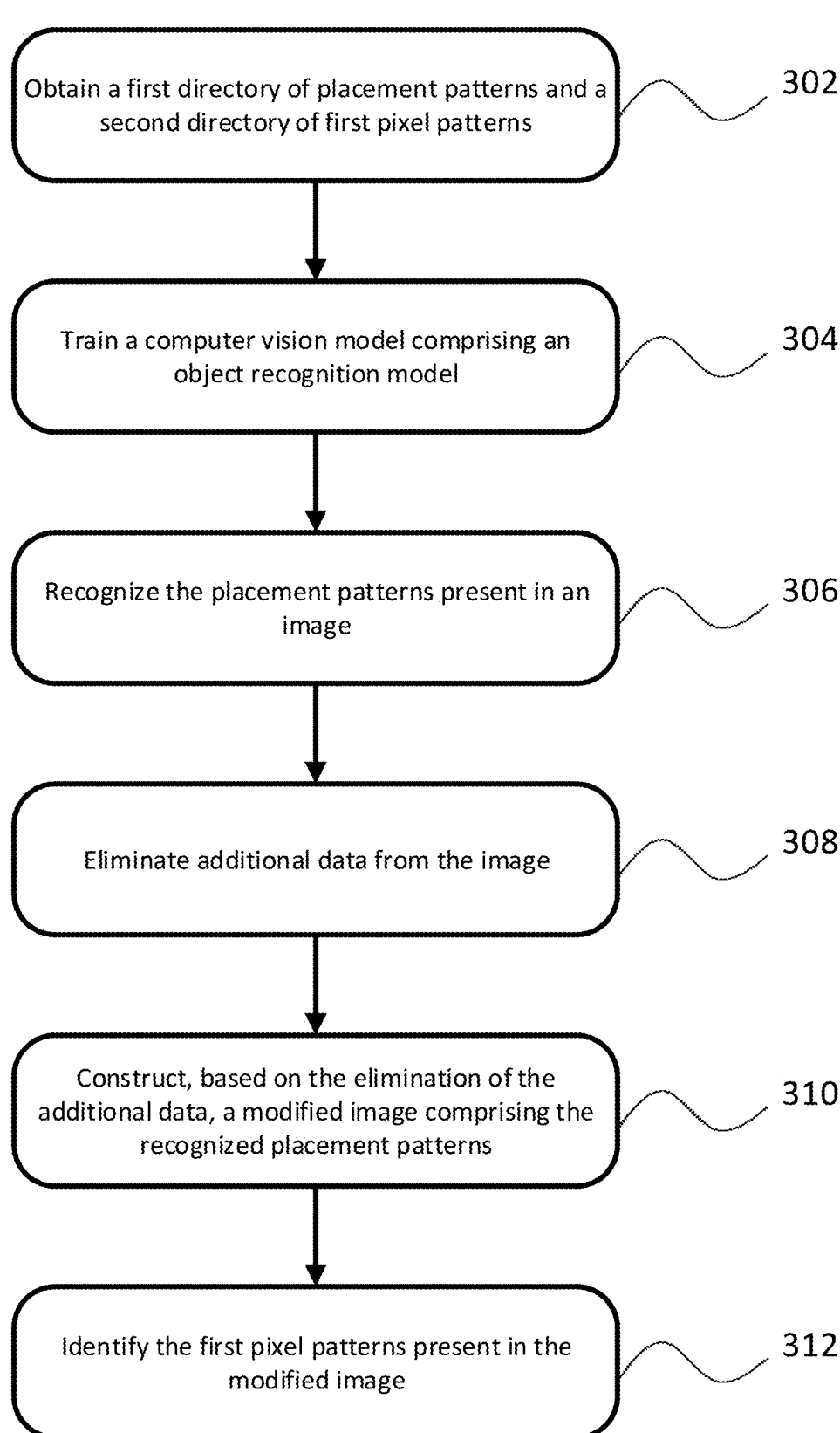

Obtain a first directory of placement patterns and a second directory of first pixel patterns — 302

Train a computer vision model comprising an object recognition model — 304

Recognize the placement patterns present in an image — 306

Eliminate additional data from the image — 308

Construct, based on the elimination of the additional data, a modified image comprising the recognized placement patterns — 310

Identify the first pixel patterns present in the modified image — 312

FIG. 3

Return a prediction based on the first pixel patterns present in the modified image — 402

Collecting a user-need data set — 404

Return a recommendation based on the placement patterns present in the image and the user-need data set — 406

Offer advertising options based on the recommendation — 408

Stream a real-time bidding data to a plurality of sponsors — 410

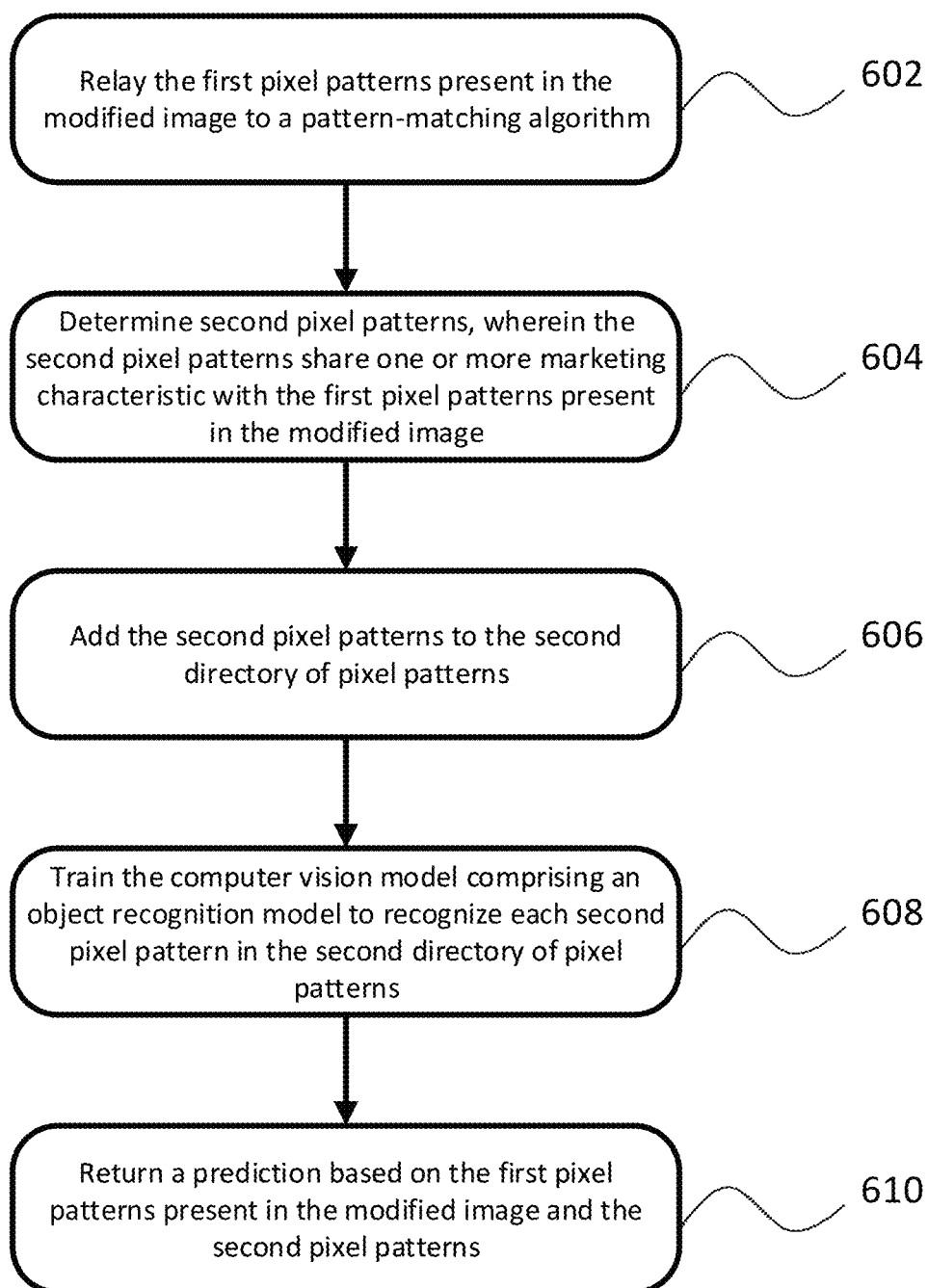

Relay the first pixel patterns present in the modified image to a pattern-matching algorithm — 602

Determine second pixel patterns, wherein the second pixel patterns share one or more marketing characteristic with the first pixel patterns present in the modified image — 604

Add the second pixel patterns to the second directory of pixel patterns — 606

Train the computer vision model comprising an object recognition model to recognize each second pixel pattern in the second directory of pixel patterns — 608

Return a prediction based on the first pixel patterns present in the modified image and the second pixel patterns — 610

FIG. 6

SYSTEM, METHOD, AND APPARATUS FOR APPLYING COMPUTER VISION, ARTIFICIAL INTELLIGENCE, AND MACHINE LEARNING TO IDENTIFY, MEASURE, AND VALUE PRODUCT PLACEMENT AND SPONSORED ASSETS

CROSS-REFERENCE TO RELATED PATENT APPLICATIONS

This application claims priority to U.S. Patent Appl. Ser. No. 63/449,463, filed Mar. 2, 2023, entitled "System, Method, and Apparatus for Applying Computer Vision, Artificial Intelligence, and Machine Learning to Identify, Measure, and Value Product Placement and Sponsored Assets," which patent application is commonly owned by the owner of the present invention. This patent application is incorporated herein in its entirety.

TECHNICAL FIELD

The present disclosure relates to information processing systems and, more particularly, to systems, methods, and apparatuses for applying computer vision technology to specialize sponsorship and advertising measurement and valuation. In particular, the present disclosure relates to technology used to apply computer vision for analysis based on targeted needs.

Additionally, the present disclosure relates to the field of marketing and advertising, and more particularly, to systems, methods, and apparatuses for providing novel marketing and advertising opportunities using a combination of computer vision and real-time predictive data to optimize product placement, and sponsored assets in some embodiments.

BACKGROUND

Advertising, sponsorship, and product placements have long been an integral part of marketing methods used by companies to drive awareness for their brands, products, or services. To attract and maintain attention and interest of viewers, advertisers need to not only create interesting and engaging content but also present that content in an optimal time and place. Accordingly, advertisers constantly look for innovative ways to advertise their products, and, more importantly, to advertise more effectively and efficiently.

For sponsors, logos and product placement are key practices for developing brand recognition and capturing the attention of viewers. Accordingly, sponsors persistently look for new and advanced ways to place their content in a manner that will reach a maximum amount of interested viewers in a more effective and efficient manner.

As a result, both advertisers and sponsors have turned to the computer vision field for logo detection as a means for identification and measurement. In the current field, logo detection through the use of computer vision often relies on the pre-training of images and then running every frame of an image (or a video) against the catalog of images and looking for matches. Functionally, computer vision programs may train a pattern of pixels to find matches of that pattern of pixels in content.

SUMMARY OF THE INVENTION

The present invention is directed to a system, method, and apparatus for applying computer vision to identify, verify, catalog and measure sponsorship and product placement. In some embodiments, the computer vision model can be trained to detect placement patterns in order to recognize common and unnecessary features that can be eliminated from the visual search field. From this, certain embodiments of the present invention are directed to a system, method, and apparatus for utilizing machine learning in conjunction with the trained computer vision model to construct a real-time valuation.

It is, accordingly, an objective of the present disclosure to effectively reduce the visual area needed to detect pattern matches. As a result, in some embodiments, the present disclosure inverts the common method for training and using computer vision models. In such an embodiment, the computer vision model can be trained to detect the placement patterns and eliminate all unnecessary additional image fields thereby increasing the efficiency and overall process speed.

In general, in one embodiment, the disclosure includes a method for using computer vision to identify sponsored assets and product placement. The method includes obtaining a first directory of placement patterns. The method also includes obtaining a second directory of first pixel patterns. The method also includes training a computer vision model including an object recognition model. The computer vision model including the object recognition model can be trained to recognize each placement pattern in the first directory of placement patterns. The computer vision model including the object recognition model can be trained to eliminate additional data, where the additional data comprises data not recognized as being in the first directory of placement patterns. The computer vision model including the object recognition model can be trained to recognize each first pixel pattern in the second directory of pixel patterns. The method also includes obtaining an image. The method also includes recognizing, using the computer vision model, the placement patterns present in the image, where the placement patterns present in the image include recognized placement patterns. The method also includes eliminating, using the computer vision model, the additional data from the image. The method also includes constructing, based on the elimination of the additional data, a modified image comprising the recognized placement patterns. The method also includes identifying, using the computer vision model, the first pixel patterns present in the modified image.

Implementations of the invention can include one or more of the following features:

The method can further include returning a prediction based on the first pixel patterns present in the modified image.

The prediction can include a piece of information associated with a brand.

The method can further include returning a recommendation to conduct additional training of the computer vision model.

The image can include a real-time visualization of a location.

The method can further include collecting a user-need data set, and returning a recommendation based on the placement patterns present in the image and the user-need data set.

The method can further include collecting visualization information comprising a set of statistical information regarding the first directory of placement patterns and training the computer vision model to construct a predictive visualization estimation, wherein the predictive visualization estimation is determined based on the visualization information.

The method can further include returning, responsive to identifying the first pixel patterns present in the modified image, a notification including a listing of the first pixel patterns present in the modified image.

The method can further include relaying the first pixel patterns present in the modified image to a pattern-matching algorithm, and determining, using the pattern-matching algorithm, second pixel patterns.

The method can further include adding the second pixel patterns to the second directory of pixel patterns, and training the computer vision model comprising an object recognition model to recognize each second pixel pattern in the second directory of pixel patterns.

The method can further include returning a prediction based on the first pixel patterns present in the modified image and the second pixel patterns.

In general, in one embodiment, the disclosure includes a system for using computer vision to identify sponsored assets and product placement. The system includes a computer system. The computer system includes one or more processors. The computer system includes memory including memory data and programming instructions, The computer system includes a network interface. The computer system includes an input-output interface, where the input-output is communicatively coupled to the one or more processors, the memory, and the network interface. The system also includes a computer vision model. The computer vision model is communicatively coupled to the input-output interface. The computer vision model includes a training data database including a first directory of placement patterns, including those specifically related to sponsorship and a second directory of first pixel patterns. The computer vision model includes an object recognition model. The object recognition model is configured to recognize each placement pattern in the first directory of placement patterns. The object recognition model is also configured to eliminate additional data, where the additional data comprises data not recognized as being in the first directory of placement patterns. The object recognition model is also configured to recognize each first pixel pattern in the second directory of pixel patterns. The system also includes a capture device, where the capture device is configured to transmit an image to the computer system.

Implementations of the invention can include one or more of the following features:

The computer system can be further configured to return a prediction to a user based on operations of the computer vision model.

The prediction can include a piece of information associated with a brand.

The computer system can be further configured to return a recommendation to conduct additional training of the computer vision model.

The image can include a real-time visualization of a location.

The system can further include a pattern-matching algorithm communicatively coupled to the computer vision model, where the pattern-matching algorithm can be configured to determine second pixel patterns.

In general, in one embodiment, the disclosure includes a computer vision model. The computer vision model includes a training data database including a first directory of placement patterns and a second directory of first pixel patterns. The computer vision model includes an object recognition model. The object recognition model is configured to recognize each placement pattern in the first directory of placement patterns. The object recognition model is also configured to eliminate additional data, where additional data comprises data not recognized as being in the first directory of placement patterns. The object recognition model is also configured to recognize each first pixel pattern in the second directory of pixel patterns.

Implementations of the invention can include one or more of the following features:

The placement patterns can correspond to real-time locations.

The pixel patterns can correspond to one or more brands.

BRIEF DESCRIPTION OF THE DRAWINGS

Other advantages of the present invention will be apparent from the following detailed description of the invention in conjunction with embodiments as illustrated in the accompanying drawings, in which:

FIG. 3 depicts a block diagram of a method for utilizing the computer vision model to identify target pixel patterns, in accordance with certain embodiments of the present disclosure.

FIG. 6 depicts a block diagram of a method for determining additional pixel patterns for use with a computer vision model, in accordance with certain embodiments of the present disclosure.

DETAILED DESCRIPTION OF THE INVENTION

Figure 1:
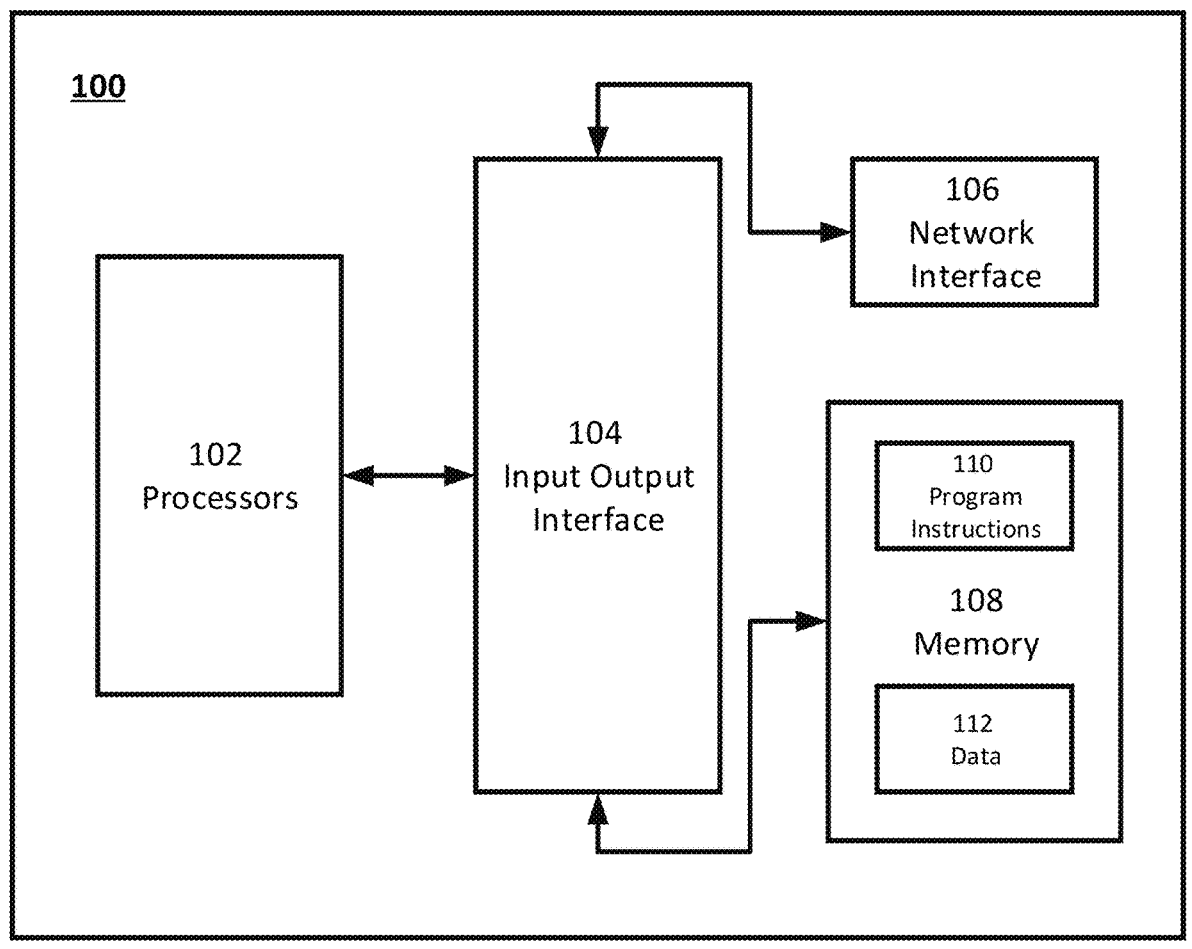
FIG. 1 depicts a computing system by which a computer vision model and system may be implemented, in accordance with certain embodiments of the present disclosure.

The present invention relates to a system, method, and apparatus for applying computer vision, artificial intelligence, and machine learning to identify, measure, and value product placement and sponsored assets based on one or more predetermined needs.

The present invention provides a process for eliminating unnecessary features from the visual source field, such that the remaining field identifies areas for targeted product placement. In some embodiments, the present invention utilizes records of assets added or altered in media post-production to enhance viewer engagement and sponsorship value. Additionally, in some embodiments, the present invention allows for the identification and valuation of virtual objects within various sponsorship contexts.

The common process for logo detection through the use of computer vision requires significant computing power and, nonetheless, results in significant inaccuracies. Specifically, the common computer vision training leads to the problem of many false positives, when the computer sees a pattern that is not actually there. This problem is exponentially exacerbated as the computer vision model scales up number of images in a catalog. As additional image patterns are introduced to the program to train the computer vision model, there is an increased likelihood that the computer vision model will return a false positive. Therefore, based on the current systems utilizing computer vision, efficiency and overall process speed need to be improved.

Additionally, this current approach for training computer vision models requires a user to pre-train the pattern before the model can be exposed to the actual content that the user wishes to analyze for the pattern. In particular, the user—in order to train the system—must have a pre-determined understanding of the specific content that it is seeking prior to having the computer vision model perform an analysis. Therefore, if and when a user becomes aware of an additional target pattern of pixels, such as a new logo, the user must re-train the computer vision model to learn this new pattern and then re-run the content in its entirety.

As the media landscape becomes more cluttered, many brands are looking for new ways to grab the attention of consumers. More importantly, brands are also looking to measure their return on investment. Additionally, those listing an asset for sale negotiate the sale of the asset based on the asset itself, not the creative work produced on the asset. Current methods for measuring the duration, size, and number of times a logo or product placement are found within a media visible environment rely on detecting the logo, or creative of the execution. The creative work is not the important part to those selling the asset. They are more interested in the measurement of the asset itself, regardless of the creative on it. For example, a team selling a jersey patch is more interested in detecting the visibility (including number of times, duration, and size) of the patch, not the Motorola logo contained within the patch.

As Name, Image, and Likeness (NIL) legislation rolled out across the country making it legal for college athletes to sign sponsorship deals with companies, the companies leaning in are more interested than ever in examining the return on investment for this new type of sponsorship. Most college athletes rely on their social media presence as a means to promote their signed sponsorship deals. This has opened a need for measuring the presence of these deals, but also for determining the value of the specific type of visibility regardless of the brand or creative specifically positioned in the promotional material.

This makes the understanding of the asset more important than ever. This is especially true for the consideration of branding new assets that were not previously branded, or determining the value of a specific type of promotion across multiple promoters. For example, a sports team may be interested in understanding the potential value of placing a logo under the backboard in a basketball game. Current technology would require a logo to already be placed there to measure the visibility.

The various problem with current computer vision models are only confounded when the user not only wants to match one or more desired logo, but also strives to understand where the logo was found in the context of the image or video representation of the space.

For example, in the context of sports, logos are often placed on fields, courts, backboards, dasherboards, stands, or even (when using virtual graphics systems with computer and camera technology) anywhere on a viewing screen. Because of the high volume of logo placement options, users want to understand which logo was found using a computer vision logo detection system, and the context of where that logo was found within the media space.

To address the aforementioned problems, the present disclosure provides an innovative system, method, and apparatus for applying computer vision, artificial intelligence, and machine learning to identify, measure, and value product placement and sponsored assets based on one or more predetermined needs. The present disclosure may reduce the visual field for applying computer vision, which in turn provides optimal analysis and targeting of content based on predetermined needs. As such, disclosed embodiments may provide a technical solution to a technical problem by reducing an amount of data processed for content targeting. As a result, in some embodiments, the disclosed techniques may enable reduction of processor, memory, and/or network bandwidth consumption, as further described herein.

In particular, in embodiments of the present disclosure, the computer vision model is capable of effectively reducing the visual area needed to detect pattern matches by inverting the widely-practiced method. For example, the computer vision model can be trained to detect the placement patterns and eliminate unnecessary additional image fields. In some embodiments, the placement patterns can include, but are not limited to basketball backboards, hockey dasherboards, and/or virtual boards, screens, and surfaces.

In the present disclosure, the computer vision model can incorporate machine learning to facilitate the present system, method, and apparatus. In such an embodiment, one or more machine learning models may operate on one or more computing systems.

In the present disclosure, the computer vision model can incorporate artificial intelligence to facilitate the present system, method, and apparatus. In such an embodiment, one or more artificial intelligence models may operate on one or more computing systems.

In some embodiments of the present disclosure, the computer vision model can use records of replacements by virtual objects provide enhanced brand visibility. Virtual objects are digital overlays placed onto media content either during production or post-production, which are not present in the original scene. For example, these objects can be strategically inserted into broadcasts, social media posts, or any digital platform to simulate the appearance of physical advertisements or sponsorships, even though they are not physically present in the environment being displayed. Accordingly, these virtual objects may be used to display content in real-time during a live broadcast or can be used to replace content during the re-air of previously broadcast footage. This virtual object technology can enable the customization of content for specific audiences, markets, or platforms, thereby optimizing the relevance and impact of the advertisement or sponsorship. Thus, the ability to replace or add objects virtually allows for a targeted approach in advertising, increasing the efficiency of product placements and sponsorships within diverse media landscapes.

FIG. 1 depicts a computing system 100 by which a computer vision model and system may be implemented, in accordance with embodiments of the present disclosure. Various portions of systems and methods described herein may include or be executed on one or more computer systems similar to computing system 100. Further, processes and modules described herein may be executed by one or more processing systems similar to that of computing system 100.

The computing system 100, in some embodiments, can include one or more processors 102 communicatively coupled to the other components of the computing system

100. While some embodiments may utilize a single processor, other embodiments of the present disclosure may utilize multiple processors through a distributed system. The one or more processors 102 may include a central processing unit that executes and subsequently performs instructions. The instructions executed by the one or more processors 102 can include, but are not limited to operations that are logical, functional, arithmetical, or a combination thereof. Further, in embodiments of the present disclosure, the one or more processors 102 may be programmable to utilize functionalities of the present disclosure.

In the computing system 100, the one or more processors 102 can be configured to receive programming instructions 110 and memory data 112 from a memory 108. In addition to being communicatively coupled to memory 108, the one or more processors 102 can be communicatively coupled to an input-output interface 104 and a network interface 106. The input-output interface 104, in certain embodiments, can receive input information from a capture device, such as a video recorder, phone, or computer operated by a user. Moreover, in the same or differing embodiments, the input-output interface 104 can send output information to a user through the capture device or another device corresponding to the user. Capture devices additionally may include graphical user interface presented on displays, computer mice, trackpads, touchpads, keyboards, keypads, voice recognition devices, gesture recognition devices, printers, audio speakers, microphones, cameras, or the other similar devices.

Further, in some embodiments, the input-output interface 104 can be configured to coordinate information between the processors 102, network interface 106, memory 108 and external devices.

The computer system 100, as mentioned, may include a network interface 106, which can connect the computer system 100 to a network or platform. In some embodiments, the network interface 106 can facilitate the exchange of data between the computer system 100 and external devices. In some embodiments, the network interface 106 can support wired communications. In other embodiments, the network interface 106 can support wireless communication. Additionally, the network may include an electronic communication network, such as the Internet, a local area network (LAN), a wide area network (WAN), a cellular communications network, or similarly functioning networks.

The computer system 100 may execute the computer vision model in order to determine product placement opportunities, optimization, and present utilization. In certain embodiments, the computer system 100 can function in tandem with a series of databases containing information to be taught to the computer vision model. In some embodiments, the information may be embodied as training data that is used to train the computer vision model.

Figure 2:
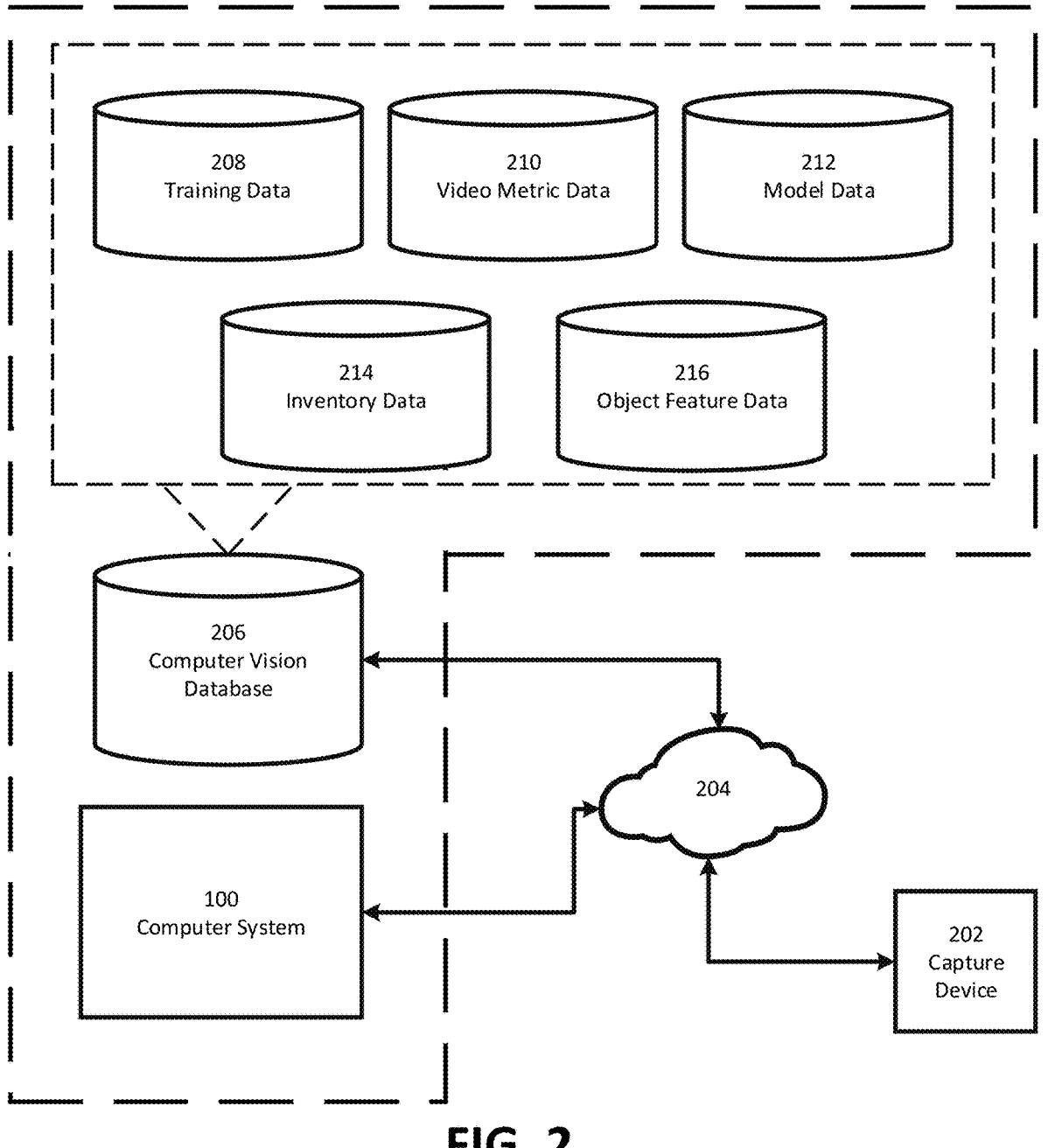
FIG. 2 depicts a computer vision model and system, in accordance with certain embodiments of the present disclosure.

FIG. 2 depicts a computer vision model and system, in accordance with certain embodiments of the present disclosure. FIG. 2 represents an example server system for running and storing the system of the present embodiment. The example system depicted through FIG. 2 may serve to obtain and utilize pixel patterns, derived from captured images, for a training data set for an object recognition model included within the computer vision model, in accordance with various embodiments.

As shown in FIG. 2, the computer vision model and system may receive training information and information for later use with the model from a capture device 202. The capture device 202 may be synonymous with the capture device referenced above in respect to FIG. 1. Accordingly, capture device 202 may include graphical user interface presented on displays, computer mice, trackpads, touchpads, keyboards, keypads, voice recognition devices, gesture recognition devices, printers, audio speakers, microphones, cameras, or the other similar devices.

The capture device 202, in some embodiments, may transmit images captured through video or pictures to a cloud network 204. The cloud network 204 can include a single network or a collection of networks.

The server system of FIG. 2 includes the computer system 100 along with computer vision databases 206, which are able to operate in tandem to communicate information through and between the cloud network 204 and the capture device 202.

The computer vision databases 206 can include training data 208, video metric data 210, model data 212, inventory data 214, and object feature data 216. Each of training data 208, video metric data 210, model data 212, inventory data 214, and object feature data 216 can be included in a single and separate database or could be spread between multiple databases. Further, in some embodiments, the training data 208, video metric data 210, model data 212, inventory data 214, and object feature data 216 can be distributed amongst a number of server systems.

In some embodiments, the computer system 100 can specify a particular object or grouping of related objects that the computer vision model can be used to recognize or identify. To facilitate the computer vision models determination of the objects, the computer system 100 may access the training data 208 in the computer vision database 206. The training data 208, in certain embodiments, can include training data directories, where each training data directory is associated to a particular pattern with which an object recognition model uses or will use to train that object recognition model for recognizing the object within an input image. The particular pattern may include a placement pattern, which can be used to specify areas or locations where objects of interest are likely to be placed within a captured image. Additionally, the particular pattern may include a pixel pattern, which can be used to identify a particular object such as a brand icon or logo that is associated with product placement determinations.

In some embodiments, the computing system 100 may be configured to perform a frame-by-frame analysis to utilize a video captured and provided by a capture device 202. For example, the computer system 100 may use information and metrics stored in video metric data 210 to take a plurality of frames contained in a captured video and provide instead an individual frame or clip to use in the computer vision model.

In some embodiments, the computing system 100 may be configured to perform a frame-by-frame analysis to utilize a video captured and provided by a capture device 202. For example, the computer system 100 may use information and metrics stored in video metric data 210 to take a plurality of frames contained in a captured video and provide instead an individual frame or clip to use in the computer vision model.

In some embodiments, the computer system 100 can be pre-trained and configured to identify particular objects based on model data 212 contained in the computer vision database 206. For such an embodiment, the connections between nodes in a neural network of the machine learning system are statically locked into place. For example, in some embodiments of the present disclosure in which the computer vision model is pre-trained, the computer system 100 may be configured to seek particular trained features, such as outline shape, exterior shape pattern, or interior feature pattern, for each image input to the neural network. In some embodiments, certain types of neural networks may be used that are particularly well-suited for image analysis. For example, in one embodiment, a convolutional neural network may be trained to analyze the images and identify certain features. Convolutional neural networks may reduce high dimensionality of images without losing information. These types of neural networks may recognize patterns in images using filters that slide along inputs and provide responses referred to as feature maps used to identify and/or classify features in pixel data.

In some embodiments, the additional data stored in the computer vision database 206, such as inventory 214 and object feature data 216, can be utilized to confirm that an object identified by the computer vision model is the object pictured in the captured image. For example, in some embodiments, the computer vision database 206 can be utilized to avoid false positives by determining whether the identified object contains an additional expected feature, such as color or corresponding text, as specified in the object feature data 216. Avoiding false positives may reduce the size of the data being considered, thereby saving processing and/or memory resources. In another example, in some embodiments, the computer vision database 206 can be utilized to avoid false positives by determining whether the identified object falls within the expected inventory data 214 for the location of the captured image.

In certain embodiments, the computer vision model can be trained to detect placement patterns and eliminate all unnecessary additional image fields. From this, in such embodiments, once the computer vision model has reduced the visual search field, the method may progress by pattern matching for pixel patterns. The pixel patterns can be particular trained logos.

FIG. 3 depicts a block diagram of a method 300 for utilizing the computer vision model to identify target pixel patterns, in accordance with certain embodiments of the present disclosure.

Method 300 begins with step 302, in which the computer system obtains a first directory of placement patterns. Additionally in step 302, the computer system obtains a second directory of pixel patterns.

Following, the example method 300 progresses to step 304, which includes training the computer vision model. The training of the computer vision model in step 304 can include training the object recognition model in the computer vision model to recognize each placement pattern in the first directory of placement patterns. Additionally, during step 304, the training of the computer vision model can include training to eliminate additional data. Additional data, in such an embodiment, can include data that is not recognized as being within the first directory of placement patterns. Moreover, during step 304, the object recognition model in the computer vision model can be trained to recognize each first pixel pattern in the second directory of pixel patterns. After the computer vision model is trained, the computer system 100 can obtain an image made up of a plurality of pixels from a capture device 202.

During step 304, the computer vision model may also be trained on the records of replacements that occurred from the use of virtual objects being placed in visible portions of various types of media. The virtual object data contained in the records of replacements can provide indications of the model's capability to produce and integrate assets, placements, and objects within media content. As such, in some embodiments, the empirical data from the records of the virtual object placements may be used train artificial intelligence algorithms of the computer vision model to discern these same assets in alternate pieces of media content.

Additionally, the virtual object records may, in some embodiments, be utilized to refine the training of models for identifying adjacent assets, placements, or objects. As these records can provide the presence of specific assets adjacent to the virtual object placements. In such an embodiment, the information regarding the identified specific assets adjacent to virtual object placements can also be fed back into computer vision model, to improve the accuracy of results concerning assets, placements, or objects that are directly observable, as well as those that are virtually added and not visible to spectators.

Once the image is introduced to the computer vision model, the trained system may progress to step 306. At step 306, the method 300 continues by recognizing the placement patterns in the image. The placement patterns recognized by the computer vision modules can then constitute recognized placement patterns.

Next, at step 308, the method 300 continues by the computer vision model eliminating the additional data from the image. Following, at step 310, the computer vision model constructs a modified image, which excludes all data that was not identified as being within a placement pattern. Thus, in some embodiments, the modified image includes only pixels included within recognized placement patterns.

In some embodiments, steps 308 and 310 can be consolidated into a single step for identifying placement patterns using records of virtual object placements. In some embodiments, the records of the placements of virtual objects may be used to delineate the segments of media that have been altered through the integration of virtual objects. In such an embodiment, the identified media segments, earmarked by the virtual object placements, offer a streamlined pathway for the computer vision model to discern and eliminate extraneous visual data. In other embodiments, the patterns rendered during the consolidated steps 308 and 310 can be used for sponsorship valuation purposes themselves.

The records of virtual object placements, in some embodiments, can include, but are not limited to, providing at a produced from these systems can include area percentage of the asset, x/y coordinates of the asset, number of pixels replaced, percent of pixels replaced, frame-by-frame tracking of the object and its subsequent replacement pixels, descriptions of the object replaced, descriptions of the branded object being replaced, descriptions of the brand being replaced, descriptions of the creative being replaced, pixel-by-pixel combined with frame-by-frame information of the replacements, game clock, wall clock, game specific data, event specific data, media platform specific data, and other types of metadata associated with the integration of the software into the media object replacement.

After the modified image is constructed, at step 312, the computer vision model identifies the first pixel patterns present in the modified image. Accordingly, in a first exemplary computer vision model, the process and system operate through the recognition of patterns associated with placements. In such an embodiment, after the incoming image and video is passed through steps 306 through 312, the resulting fields can then be stored thereby reducing the visual fields needed to be scanned. Further, in some embodiments, the results of first exemplary computer vision model can be tagged as trained placements.

In some embodiments, method 300 may continue by using the computer vision model to determine all patterns of pixels that can be grouped based on a set characteristic. From this, in some embodiments, the method 300 can also include matching other pixel patterns in the saved training directories into the established grouping. Next, method 300 may continue by assigning each grouping a unique identifier. Using the unique identifiers, in certain embodiments, the groupings can be tagged as a single identified logo.

Figure 4:
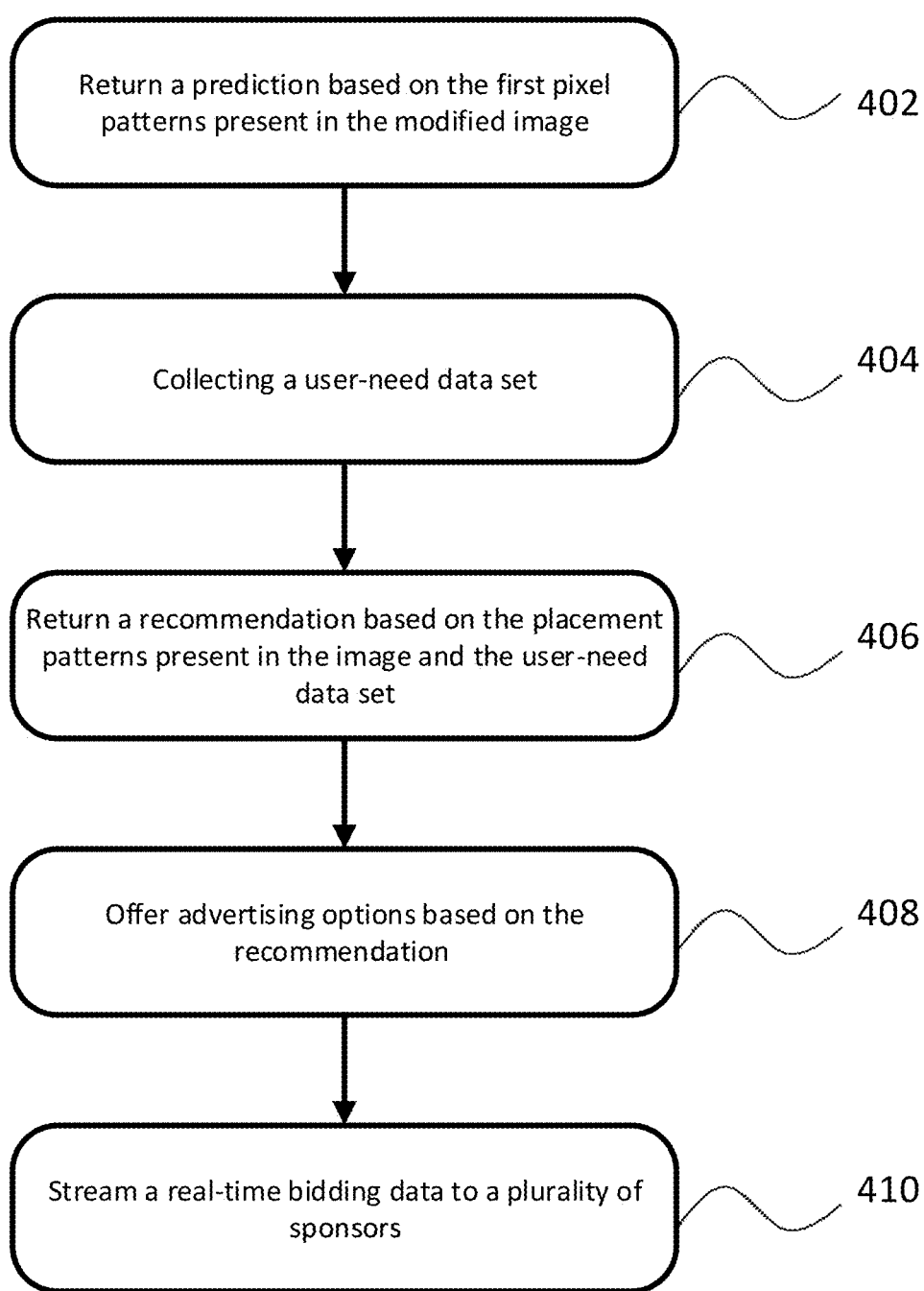
FIG. 4 depicts a block diagram of a method for using predictive analytics and a computer vision model to value the placement of a target pixel cluster based on pre-determined needs, in accordance with certain embodiments of the present disclosure.

FIG. 4 depicts a block diagram of a method 400 for using predictive analytics and a computer vision model to value the placement of a target pixel cluster based on pre-determined needs, in accordance with certain embodiments of the present disclosure. FIG. 4 shows a progression and following steps that can be used in conjunction with the method 300 depicted in FIG. 3.

The method 400 begins at step 402 where the computer system 100 return a prediction of which pre-trained logo is most like the pattern of the results based on the identification performed in step 312 of method 300. In some embodiments, the prediction may alert a user that the results are "unknown" or that the identified logo does not match anything in the trained directories to an extent that would result in a firm confidence score.

Following, or in certain embodiments concurrently with, step 402 the method 400 proceeds with step 404 to collect a user-need data set. In some embodiments, a user-need data set can be a set of information and statistics regarding consumer preferences. In some embodiments, the user-need data set can include preference information collected from real consumers. From this, at step 406, the method 400 includes returning a recommendation based on the placement patterns present in the captured image and user-need data set.

Step 408 of method 400 continues with using the computer system 100 to offer advertising options based on the recommendation provided at step 406. Once the computer system 100 extends an offer in step 408, the method 400 continues with step 410 by using the computer system 100 and network 204 to stream real-time bidding data to a plurality of potential sponsors.

Real-time bidding can be utilized to allow potential advertisers to bid on a specific digital asset, such as a banner ad on the top of a website homepage. In the aforementioned example using real-time bidding, if the bid is won, the digital asset is instantly displayed at the top of the homepage. There can be various forms real-time bidding used in accordance with the present disclosure. For example, real-time bidding may be performed in the digital space. In some embodiments, bidders can enter the minimum and maximum amount they are willing to pay, or an amount set by the seller, for an asset. In this embodiment, if a bidder prevails on their bid, the buyer can have their digital asset displayed for the price ranging between the minimum and maximum amounts.

Rather than selling an asset that will be placed on a website, in some embodiments, bids can be placed for actual assets appearing in a live sports or entertainment event. In some examples, the winning bidder can have its product displayed on an LED board within a stadium or arena for the pre-sold amount of time during a specifically outlined portion of the game. As an example, an NFL team can offer a three-minute advertising slot on its bench back LED at the start of the third quarter and multiple potential buyers can bid on this asset with the eventual winning bidders creative appearing in the slot at the allotted time for the allotted duration.

In some embodiments, the marketplace can include the list of assets an advertiser can bid on alongside the historical performance data for the asset being listed. For example, in some embodiments, the system can allow the potential buyer to make an informed decision regarding the asset it wishes to bid on. In some embodiments, a minimum price can be set by the asset seller.

Using a placement first approach can allow for determining the media visibility value in a variety of ways. As a first example, the place where a sponsorship logo will appear can be valued regardless of if the logo is present or not. In such an example, the computer vision model can determine the duration and frequency with which a pair of pants are visible in a round of golf despite the lack of a visible logo. As a second example, the valuation can include product placement such as determining the media value of a bottle on the sidelines of a hockey game. In a third example, the more traditional option of valuing the presence of a specific logo can be deployed. The present disclose can utilize the valuation of types of assets uniquely, or in various combinations whereas previous approaches required multiple methods for achieving valuation.

By building a database of the presence of assets, objects, and logos, the present disclosure can produce a path for building large-scale predictive analytics for real-time valuation. Specifically, in certain embodiments, the computer vision model can be built to determine how certain inputs variables influence results. As an example, every play within a sporting competition can be broken down into a describable "play-by-play" feature. In such an example, a pitch in baseball resulting in a hit to center field then resulting in an out at first can be logged and associated with the time it occurred. This play-by-play information is available in real-time as a service from multiple companies. The computer vision model, in some embodiments, can be trained to build predictive analytics using the time-locked play-by-play data and the detection of visible sponsorship assets, placements, and objects. As a result, the computer vision model can take in the play-by-play data as a predictor and output the specific objects that would be visible on screen when those plays occur.

This combination of computer vision models and play-by-play information producing predictive analytics would allow for the creation of a real-time sponsorship asset valuation that to be served. This service could be of benefit to many parties interested in sponsorship performance and valuation.

Figure 5:
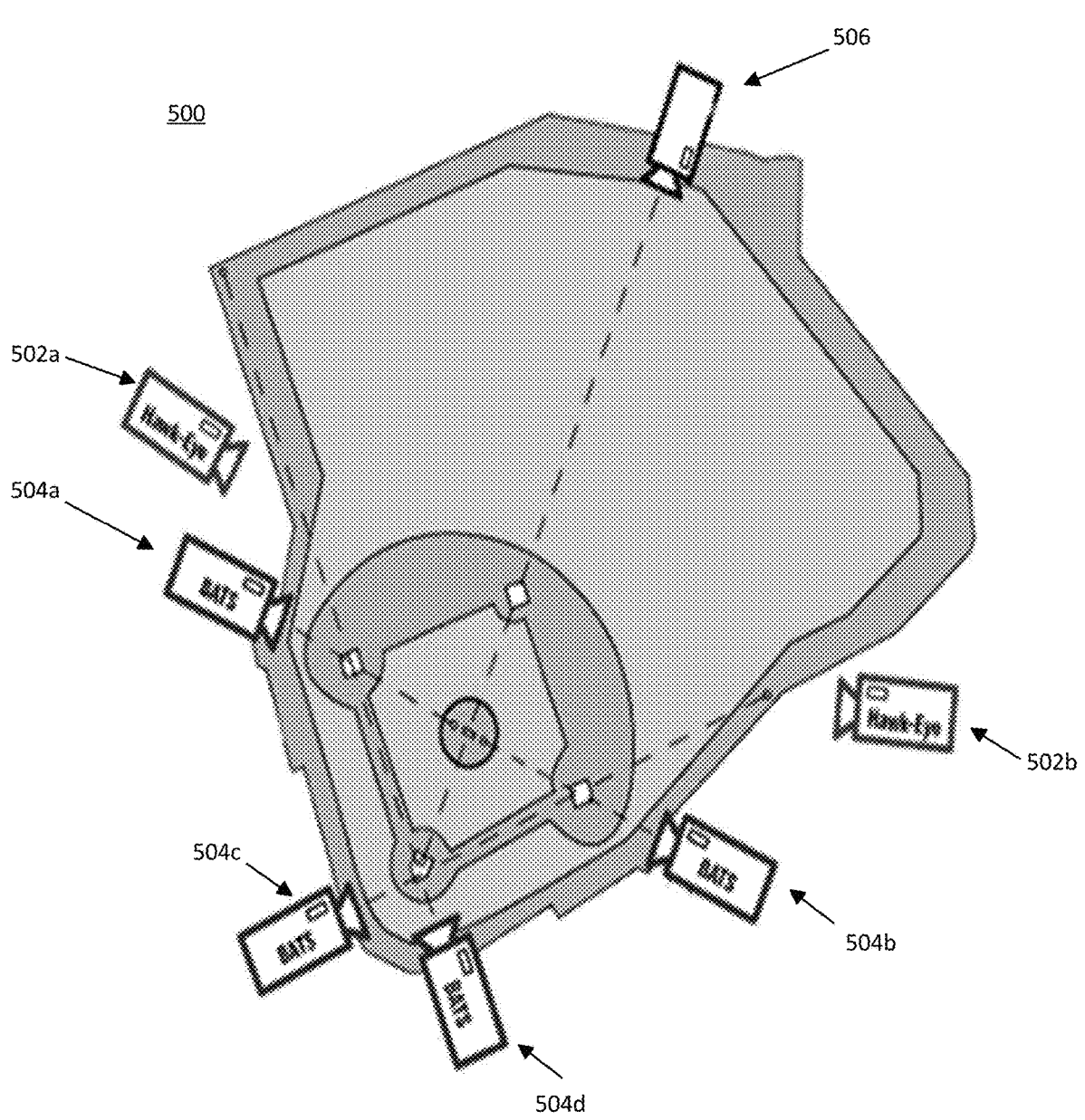
FIG. 5 depicts an exemplary setting for use when training a predictive computer vision model to value the placement of a target pixel cluster based on pre-determined needs, in accordance with certain embodiments of the present disclosure.

FIG. 5 depicts an exemplary setting for use when training a predictive computer vision model to value the placement of a target pixel cluster based on pre-determined needs, in accordance with certain embodiments of the present disclosure.

Taking the example shown in FIG. 5, in baseball, if the play-by-play states a home run was hit to the right side of the park, the predictive model can examine the same play over thousands of previous home runs to right field to provide a prediction of which assets, logos, and objects were present during this play. In this example and applicable for a variety of sports, the camera angle of the broadcast can be predicted by the play-by-play and combined with the detection data obtained through the training and repeated use of methods 300 and 400.

As shown in FIG. 5, data regarding the recorded field 500 can be collected based on information collected from a variety of cameras. In recorded field 500, the hawk-eye view information is collected by left hawk-eye camera 502a and right hawk-eye camera 502b. Further, the bat information is collected by four differently positioned bat cameras 504a through 504d. Moreover, overview camera 506 provides an even broader view of information.

In this example, the information retrieved from cameras 502 through 506 can be utilized as datasets. Accordingly, in some embodiments, the datasets can be utilized to train the machine learning model. In some embodiments, the datasets can include play-by-play data, tagged camera angles for broadcasts, and a list of visible assets, logos, and objects for each camera angle. As such, in certain embodiments, this process may be utilized to create a real-time valuation, a predictive valuation, or combinations thereof, as discussed above.

Providing performance data on sponsorship assets, logos, objects, and product placements in one location can allow users the capability to evaluate the effectiveness of the specific asset when it comes to its media visibility is the first step in providing a marketplace for buying and selling assets. Thus, in some embodiments, the system of the present disclosure allows an entity with an asset to sell listing the asset with pricing information in a place where a potential buyer can evaluate the performance of that asset results in a smoother, more satisfying transaction. In certain embodiments, sellers can list the asset location, size, and specific contractual duration which can then be provided alongside a comparison and benchmarking for the specific team or league with which the asset is being provided for sale.

For example, if an NFL team wanted to list three minutes of an upper-level LED for sale, a potential buyer can look at how upper-level LEDs translate into frequence of visibility, duration on screen during broadcast, media equivalency value for the specific team offering the asset for sale, but also how that compares to other upper-level LED assets within the NFL. From this, in the example embodiment, a potential buyer could decide that the specific team offering this asset for sale underperforms compared to other teams who may be offering the asset at a lower price. Alternatively, in another embodiment, a potential buyer could see that the price would result in a much higher return on investment and execute the purchase armed with that knowledge.

FIG. 6 depicts a block diagram of a method 600 for determining additional pixel patterns for use with a computer vision model, in accordance with certain embodiments of the present disclosure. Method 600, which provides additional steps to follow method 300, begins at step 602 where the computer system relays the first pixel pattern present in the modified image to a pattern-matching algorithm. Continuing, at step 604, the pattern algorithm is then used to determine second pixel patterns. The second pixel patterns can include patterns of pixels that share one or more marketing characteristic with the first pixel patterns present in the modified image. In some embodiment, the marketing characteristic can be associated with the content of the brand whose logo, icon, or asset is displayed in the product placement recognized as a pixel pattern.

Following, at step 606, method 600 progresses by adding the second pixel patterns to the second directory of pixel patterns in the computer vision model. Once the second pixel patterns are added to the trained data, the computer vision model can continue to step 608 to re-train the system. In particular, in certain embodiments, the object recognition model may be trained to recognize each second pixel pattern in the second directory of pixel patterns.

After the computer vision model has been re-trained, as shown in step 610, the method 600 concludes with returning a prediction based on both the first pixel patterns present in the modified image and the second pixel patterns identified by the pattern-matching algorithm.

In embodiments of the present disclosure, the machine learning techniques utilized may include, but are not limited to, one or more of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or combinations thereof.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described. The symbol "~" is the same as "approximately".

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification are to be understood as being modified in all instances by the term "about." Accordingly, unless indicated to the contrary, the numerical parameters set forth in this specification are approximations that can vary depending upon the desired properties sought to be obtained by the presently disclosed subject matter.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for using computer vision to identify product placement utilizing a computer system comprising (A) one or more processors, (B) memory comprising memory data and programming instructions, (C) a network interface, and (D) an input-output interface, wherein the input-output is communicatively coupled to the one or more processors, the memory, and the network interface, the method comprising:
   (a) obtaining a first directory of placement patterns;
   (b) obtaining a second directory of first pixel patterns;
   (c) training a computer vision model comprising an object recognition model to
      (i) recognize each placement pattern in the first directory of placement patterns, (ii) eliminate additional data, wherein the additional data comprises data not recognized as being in the first directory of placement patterns, and
      (iii) recognize each first pixel pattern in the second directory of pixel patterns;
   (d) obtaining an image;
   (e) recognizing, using the computer vision model, the placement patterns present in the image, wherein the placement patterns present in the image comprise recognized placement patterns;
   (f) eliminating, using the computer vision model, the additional data from the image;
   (g) constructing, based on the elimination of the additional data, a modified image comprising the recognized placement patterns;
   (h) identifying, using the computer vision model, the first pixel patterns present in the modified image;
      (i) collecting visualization information comprising a set of statistical information regarding the first directory of placement patterns;
      (i) training the computer vision model to construct a predictive visualization estimation, wherein the predictive visualization estimation is determined based on the visualization information;
   (k) collecting a user-need data set; and
   (l) returning, using the input-output interface, a recommendation based on the placement patterns present in the image and the user-need data set.

2. The method of claim 1, further comprising returning a prediction based on the first pixel patterns present in the modified image.

3. The method of claim 2, wherein the prediction comprises a piece of information associated with a brand.

4. The method of claim 1, further comprising returning a recommendation to conduct additional training of the computer vision model.

5. The method of claim 1, wherein the image comprises a real-time visualization of a location.

6. The method of claim 1, further comprising returning, responsive to identifying the first pixel patterns present in the modified image, a notification comprising a listing of the first pixel patterns present in the modified image.

7. The method of claim 1, further comprising:
   (a) relaying the first pixel patterns present in the modified image to a pattern-matching algorithm; and
   (b) determining, using the pattern-matching algorithm, second pixel patterns.

8. The method of claim 7, further comprising:
   (a) adding the second pixel patterns to the second directory of pixel patterns; and
   (b) training the computer vision model comprising an object recognition model to recognize each second pixel pattern in the second directory of pixel patterns.

9. The method of claim 7, further comprising returning a prediction based on the first pixel patterns present in the modified image and the second pixel patterns.

10. A system for using computer vision to identify product placement, the system comprising:
   (a) a computer system comprising
      (i) one or more processors,
      (ii) memory comprising memory data and programming instructions,
      (iii) a network interface, and
      (iv) an input-output interface, wherein the input-output is communicatively coupled to the one or more processors, the memory, and the network interface;

(b) a computer vision model, wherein the computer vision model is communicatively coupled to the input-output interface, and the computer vision model comprises (i) a training data database comprising a first directory of placement patterns and a second directory of first pixel patterns; and (ii) an object recognition model, wherein the object recognition model is configured to (A) recognize each placement pattern in the first directory of placement patterns, (B) eliminate additional data, wherein the additional data comprises data not recognized as being in the first directory of placement patterns, (C) recognize each first pixel pattern in the second directory of pixel patterns; and (c) a capture device, wherein the capture device is configured to transmit an image to the computer system, wherein the system is configured to (i) eliminate using the computer vision model, the additional data from the image;

(ii) construct, based on the elimination of the additional data, a modified image comprising the recognized placement patterns;

(iii) identify, using the computer vision model, the first pixel patterns present in the modified image;

(iv) collect visualization information comprising a set of statistical information regarding the first directory of placement patterns;

(v) train the computer vision model to construct a predictive visualization estimation, wherein the predictive visualization estimation is determined based on the visualization information;

(vi) collect a user-need data set; and (vii) returning, using the input-output interface, a recommendation based on the placement patterns present in the image and the user-need data set.

11. The system of claim 10, wherein the computer system is further configured to return a prediction to a user based on operations of the computer vision model.

12. The system of claim 11, wherein the prediction comprises a piece of information associated with a brand.

13. The system of claim 10, wherein the computer system is further configured to return a recommendation to conduct additional training of the computer vision model.

14. The system of claim 10, wherein the image comprises a real-time visualization of a location.

15. The system of claim 10, further comprising a pattern-matching algorithm communicatively coupled to the computer vision model, wherein the pattern-matching algorithm is configured to determine second pixel patterns.

* * * * *